United States Patent
Goss et al.

(10) Patent No.: US 11,726,921 B2
(45) Date of Patent: Aug. 15, 2023

(54) COMBINED PAGE FOOTER FOR PARALLEL METADATA STORAGE

(71) Applicant: Seagate Technology LLC, Fremont, CA (US)

(72) Inventors: Ryan James Goss, Prior Lake, MN (US); Daniel John Benjamin, Savage, MN (US); David W. Claude, Loveland, CO (US); Graham David Ferris, Savage, MN (US); Ryan Charles Weidemann, Victoria, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/929,775

(22) Filed: May 21, 2020

(65) Prior Publication Data

US 2021/0365384 A1 Nov. 25, 2021

(51) Int. Cl.
*G06F 12/1009* (2016.01)

(52) U.S. Cl.
CPC .... *G06F 12/1009* (2013.01); *G06F 2212/657* (2013.01)

(58) Field of Classification Search
CPC ......... G06F 12/0246; G06F 2212/7201; G06F 2212/1024; G06F 12/1009; G06F 2212/657
See application file for complete search history.

(56) References Cited

U.S. PATENT DOCUMENTS

| | | | |
|---|---|---|---|
| 7,844,772 B2 | 11/2010 | Moon et al. | |
| 8,291,155 B2 | 10/2012 | Lai et al. | |
| 10,126,964 B2 | 11/2018 | Munsil et al. | |
| 10,229,052 B2 | 3/2019 | Canepa et al. | |
| 2014/0082261 A1* | 3/2014 | Cohen | G06F 3/0688 711/103 |
| 2014/0101369 A1* | 4/2014 | Tomlin | G06F 12/0246 711/103 |
| 2016/0154594 A1 | 6/2016 | Kang | |
| 2018/0275899 A1* | 9/2018 | Munsil | G06F 12/0811 |

\* cited by examiner

*Primary Examiner* — Gary W. Cygiel
(74) *Attorney, Agent, or Firm* — Hall Estill Law Firm; Randall K. McCarthy

(57) ABSTRACT

Apparatus and method for managing metadata in a data storage device such as a solid-state drive (SSD). The metadata are stored in combined (combo) pages in a non-volatile memory (NVM) each having first and second level map entries. The second level map entries provide a logical-to-physical address translation layer for user data blocks stored to the NVM, and the first level map entries describe the second level map entries in the combo page. A global map structure is accessed to identify a selected combo page in the NVM associated with a pending access command. The first and second level map entries are retrieved from the combo page, and the second level map entries are used to identify a target location for the transfer of user data blocks to or from the NVM.

20 Claims, 6 Drawing Sheets

US 11,726,921 B2

COMBINED PAGE FOOTER FOR PARALLEL METADATA STORAGE

SUMMARY

Various embodiments of the present disclosure are generally directed to the management of metadata in a non-volatile memory, such as in a solid-state drive (SSD).

In some embodiments, the metadata are stored in combined (combo) pages in a non-volatile memory (NVM) each having first and second level map entries. The second level map entries provide a logical-to-physical address translation layer for user data blocks stored to the NVM, and the first level map entries describe the second level map entries in the combo page. A global map structure can be accessed to identify a selected combo page in the NVM associated with a pending access command. The first and second level map entries are retrieved from the combo page, and the second level map entries are used to identify a target location for the transfer of user data blocks to or from the NVM.

These and other features which may characterize various embodiments can be understood in view of the following detailed discussion and the accompanying drawings.

DETAILED DESCRIPTION

Figure 1:
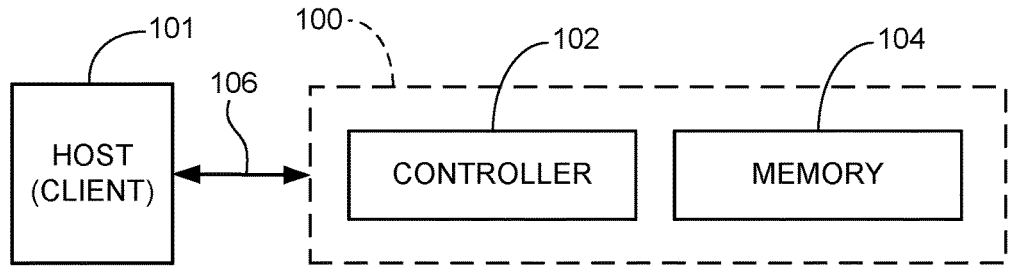
FIG. 1 provides a functional block representation of a data storage device in accordance with various embodiments.

Solid state drives (SSDs) are data storage devices that store user data in non-volatile memory (NVM). A controller directs the transfer of user data between the NVM and a host (client) device. The NVM will usually be NAND flash memory, but other forms of solid-state memory can be used. The flash may be subdivided into garbage collection units (GCUs) which are allocated and erased as a unit.

Metadata, in the form of map data, are used to track the locations of data blocks stored to the NVM. Different forms of metadata can be used depending on the application. Some metadata arrangements include a forward table and a reverse directory. The forward table may be in the form of an address translation layer that provides logical to physical address conversion. The reverse directory may be stored in each GCU and provides a physical to logical address conversion for the data stored in the GCU.

The forward table, also referred to as a map, is useful during normal data accesses to locate the most current versions of data blocks to service client read and write commands. The reverse directory is helpful during garbage collection since it provides a local listing of each of the data blocks in the associated GCU, enabling the system to discriminate between current data blocks which are relocated to a new GCU and stale data blocks which are erased during the garbage collection operation.

The map metadata may be stored and arranged as snapshots with intervening journals. Some structures use a first level map and a second level map. The second level map provides metadata entries that show where the user data blocks are variously stored in the NVM, and the first level map points to the second level metadata entries.

A typical data read operation may include locating and accessing a first level map entry for the data, using the first level map entry to locate the second level map entry, accessing the NVM to retrieve the second level map entry, decoding the second level map entry to locate the requested data in the NVM, and then accessing the NVM to retrieve the requested data. A typical data write operation is similar to a read operation, except that the new write data are written to a new GCU in the NVM, and the map metadata are updated to point to this new location for the current version of the data and to mark the previous version(s) of the data as stale.

While not limiting, it is common to load the first level map to an internal processor memory such as SRAM, and to load portions of the second level map to an external processor memory such as DRAM. The entirety of the second level map may be too large to fit in the external memory, so map swap and update operations may be carried out to enable the required portions of the second level map to be loaded and jettisoned as required.

While useful, this type of metadata arrangement can be extremely large, and will become even larger as SSDs with ever greater data storage capacities are introduced into the market. A large metadata map structure is difficult to load during initialization and difficult to update during operation; it will be appreciated that the larger the map, the larger the amount of resources will be required to store, manage and update the map.

Accordingly, various embodiments of the present disclosure are generally directed to improvements in the arrangement of map metadata in a data storage device. The data storage device has a controller and an NVM. The data storage device may take the form of an SSD, in which case the NVM may comprise flash memory.

The proposed solution involves the use of a multi-level metadata map structure by the data storage device. A two-level map is contemplated but not necessarily required. Second level map entries are generated to provide a translation layer (e.g., a flash translation layer, FTL) to enable the controller to locate the most current versions of data blocks in the NVM. The second level map entries are arranged in pages of memory in the NVM referred to as map pages. The map pages are also referred to as "combined pages" or "combo pages." The terms "combined" and "combo" refer to the fact that the page stores a combination of both first and second level map entries in the same physical area of memory.

Each combo page includes a metadata map structure sometimes referred to as a "combo page footer." The combo page footer constitutes first level map entries that describe the second level map entries in the associated combo page. In some cases, a global map structure is developed to track the locations of the combo page footers. The global map structure can be loaded to local memory and used to access the combo page footers as required.

In one embodiment, each combo page is nominally 32 KB in size and stores the second level metadata entries grouped into 4 KB blocks. These blocks of metadata are sometimes referred to as second level blocks (SLBs). The combo page footer, also referred to as a first level block (FLB), is another 4 KB block that describes the SLBs in that page. The combo page footer can be arranged as a table that lists the various second level entries in the page. While the combo page footer is described as a footer, various locations for the metadata information can be used apart from the last block in the combo page.

A fast search of the footer can identify which block(s) of the second level metadata are required, and then the appropriate block(s) can be retrieved to the local memory for use. These steps can be carried out during initialization or during normal operation. By distributing the metadata for various chunks across different die/channel combinations, it is contemplated that the metadata can be retrieved efficiently since the processing can take place in parallel.

It is contemplated that the combo page footer structures can reduce the size of both the first and second level maps, as well as reduce the footprint of local memory (e.g., SRAM, DRAM) needed to load the map data by moving some of the contents of the first level map into the NVM. The first level map can be retained and modified to point to the combo page footers, which as described above show where the individual blocks are within the associated page.

These and other features and advantages of various embodiments can be understood beginning with a review of FIG. 1 which provides a functional block diagram of a data storage device 100. The device 100 is coupled to an external host (client) device 101, and incorporates a controller 102 and a memory module 104.

The controller block 102 represents a hardware based and/or programmable processor based circuit configured to provide top level communication and control functions. The memory module 104 includes solid state non-volatile memory (NVM) for the storage of user data. During normal operation, the client device 101 issues data access commands to the storage device 100, such as read and write commands. Write commands are serviced by writing data supplied from the client to the NVM. Read commands are serviced by locating and retrieving data requested by the client from the NVM and transferring the retrieved data to the client.

Figure 2:
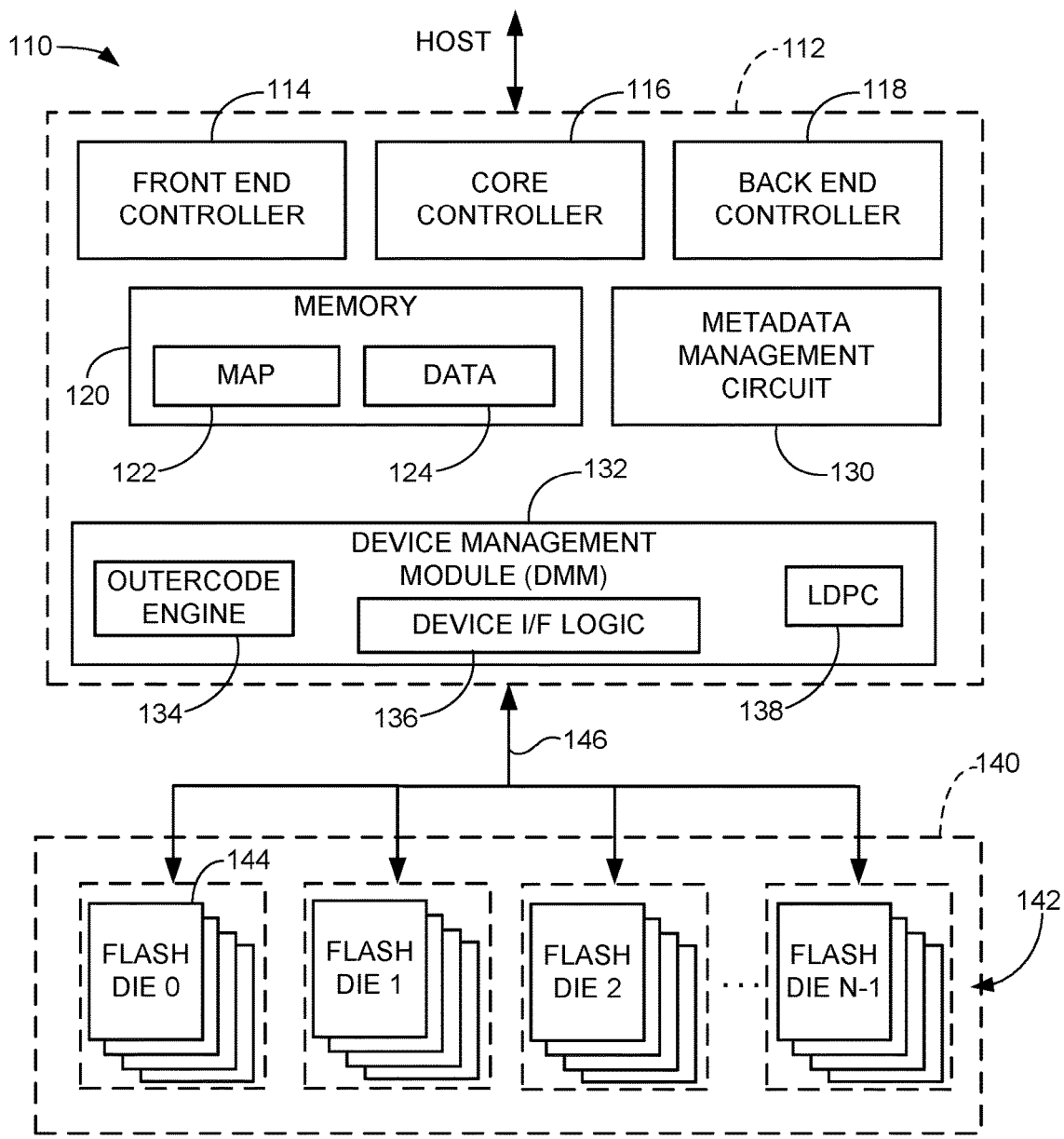
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more client devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data. Each die set may form a portion of an NVMe namespace that may span multiple SSDs or be contained within a single SSD.

The SSD 110 includes a controller circuit 112 that generally corresponds to the controller 102 of FIG. 1. The controller circuit 112 includes a front end controller 114, a core controller 116 and a back end controller 118. The front end controller 114 performs host I/F functions, the back end controller 118 directs data transfers with the memory module 120 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more metadata map structures 122 and one or more sets of user data 124 that are cached or buffered during data transfers with a client (e.g., 101, FIG. 1). A metadata management circuit 130 manages the metadata map structures 122 as described below.

A device management module (DMM) 132 supports back end processing operations. The DMM 132 includes an outer code engine circuit 134 to generate outer code, a device I/F logic circuit 136 to provide data communications, and a low density parity check (LDPC) circuit 138 configured to generate LDPC codes as part of an error detection and correction strategy used to protect the data stored by the by SSD 110.

A memory module 140 corresponds to the memory 104 in FIG. 1 and includes an NVM in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
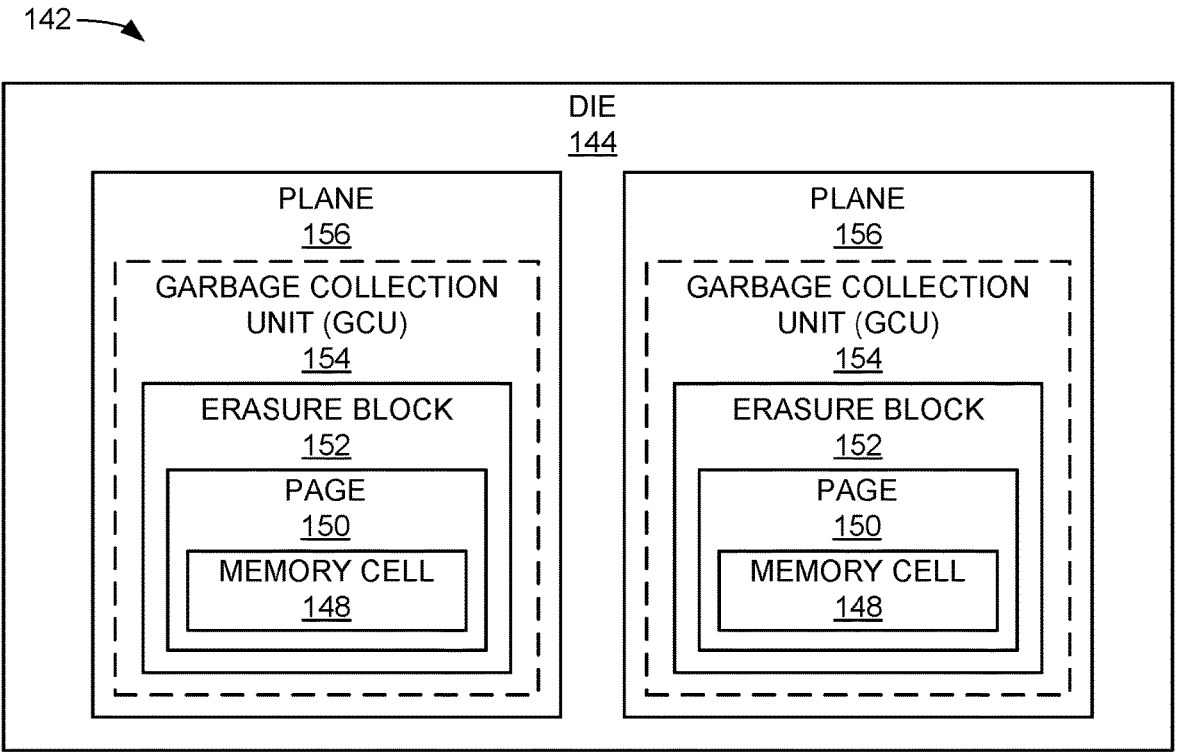
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; some current generation flash memory pages are arranged to store 32 KB (32,768 bytes) of user data.

The memory cells 148 associated with a number of pages are integrated into an erasure block 152, which represents the smallest grouping of memory cells that can be concurrently erased in a NAND flash memory. A number of erasure blocks 152 are in turn incorporated into a GCU 154, which are logical storage units that utilize erasure blocks across different dies. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four planes per die, etc. can be used. Generally, a plane is a subdivision of the die 144 arranged with separate read/write/ erase circuitry such that a given type of access operation (such as a write operation, etc.) can be carried out simultaneously by each of the planes to a common page address within the respective planes.

Figure 4:
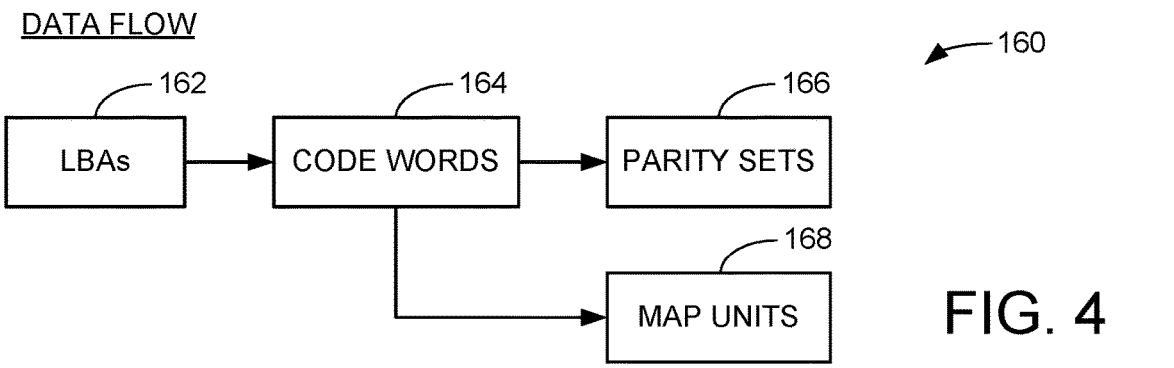
FIG. 4 illustrates a data flow of the SSD of FIG. 2.

FIG. 4 provides a data flow sequence 160 to describe the processing of input user data from a client device such as 101 in FIG. 1. Other arrangements can be used. User data blocks with associated logical addresses are represented at 162. The logical addresses may be logical block addresses (LBAs), but other forms can be used including key values, virtual block addresses, etc. Prior to storage in the flash memory 142, the blocks are arranged into code words 164, which include user data bits and error correction code (ECC) bits to facilitate recovery during a read operation. The ECC bits may take the form of LDPC (low density parity check) bits.

A selected number of the code words may be arranged into pages, and a selected number of pages may in turn be arranged into parity sets 166. In one non-limiting example, 31 pages of code words are combined such as through an exclusive-or (XOR) operation to generate a parity value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure.

The parity sets 166 are transferred for storage by the flash in the selected GCU. For mapping purposes, groups of the code words 164 are further arranged into map units 168. Map units represents groupings that enable the mapping system of the SSD to locate and retrieve the code words stored to the flash memory.

Figure 5:
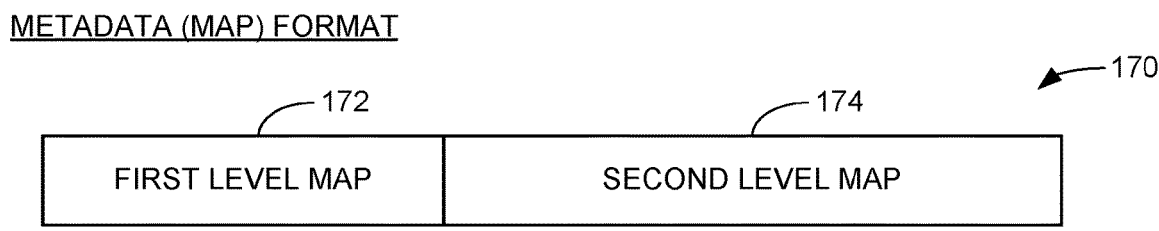
FIG. 5 is a format for metadata used by the SSD arranged as a two-level map.

FIG. 5 shows the map metadata to be arranged as a two level map 170. Other mapping structures can be used including a single level map, a multi-level map with more than two levels, etc. The map 170 includes a first level map 172 and a second level map 174.

The second level map 174 provides second level map entries that operate as a flash transition layer (FTL) with a physical to logical association of addresses to enable location of the desired user data blocks via the map units 168. The first level map 172 provides first level map entries that identify the locations of the second level entries.

FIGS. 6 through 9 illustrate the manner in which the map metadata in the first and second level maps 172, 174 are arranged and utilized in accordance with some embodiments. Other arrangements can be used as desired. It will be understood that these various operations are carried out by or under the direction of the metadata management circuit 130 of FIG. 2.

Figure 6:
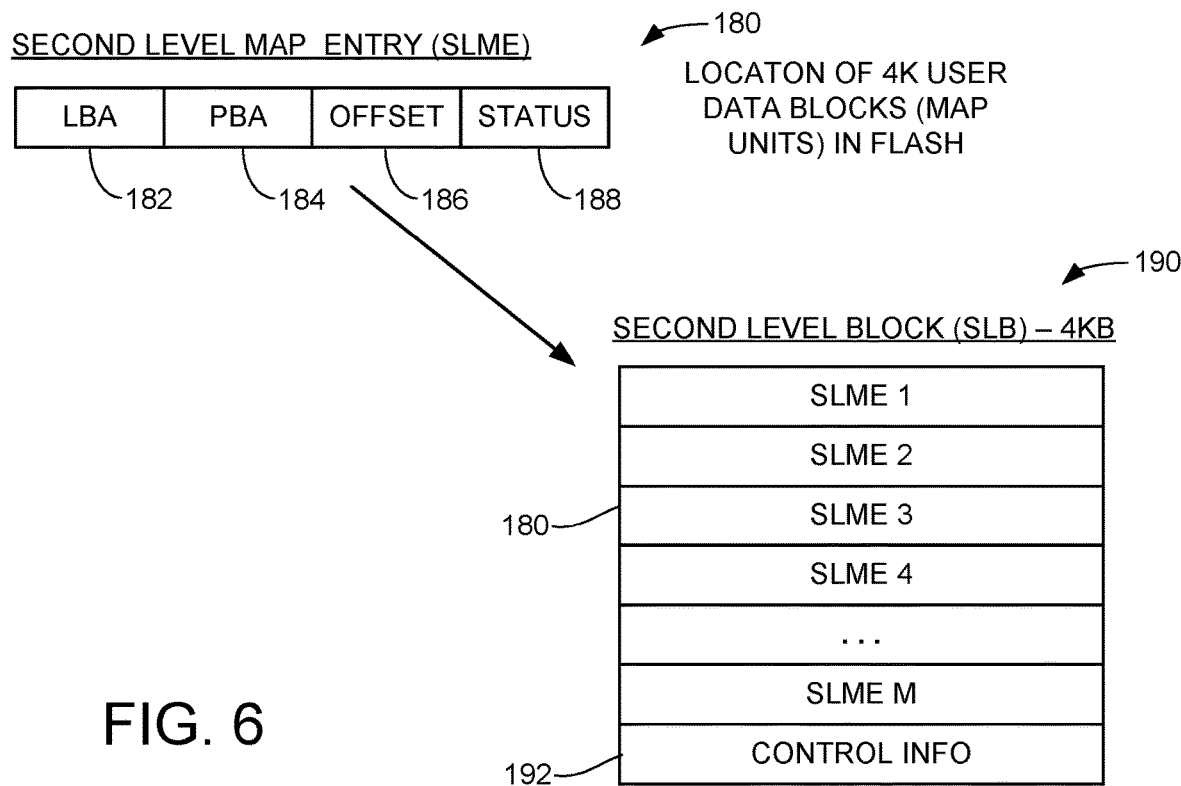
FIG. 6 illustrates an arrangement of second level map entries from FIG. 5 in some embodiments.

Beginning with FIG. 6, a data structure referred to as a second level map entry, or SLME, is denoted at 180. Each SLME 180 serves as a part of the second level map 174 and tracks the location of a selected amount of user data in the flash memory. As noted above, each SLME 180 can track a separate map unit 168, which represents 4 KB of user data. Other granularities can be used.

The SLME 180 has various fields including a logical block address (LBA) field 182, a physical block address (PBA) field 184, an offset field 186 and a status field 188. The LBA values are sequential from a minimum value to a maximum value (e.g., from LBA 0 to LBA X with X being some large number determined by the overall data capacity of the SSD or some other factor such as the number of blocks allocated to a particular user). As noted above, other logical addressing schemes can be used such as key-values, virtual block addresses, etc. While the LBA values may form a part of the entries, in other embodiments the LBAs may instead be used as an index into the associated data structure to locate the various entries.

The PBA field 184 provides a physical address for the associated data blocks. As discussed above in FIG. 3, the physical address can be described including in terms of array, die, garbage collection unit (GCU), erasure block, page, etc. The offset value in field 186 may be a bit offset along a selected page of memory. The status value in field 188 may indicate the status of the associated block (e.g., valid, invalid, null, forward pointer to another entry, etc.).

Groups of the SLMEs 180 are in turn arranged into larger sets of data referred to as second level blocks (SLBs) 190. A total of M SLMEs 180 are shown to constitute the SLB 190, where M is a plural integer. While not limiting, in some embodiments a sufficient number of the SLMEs are accumulated to provide the SLB 190 with a block size of nominally 4 KB. A control field 192 stores control information associated with the SLB, such as a unique SLB identification (ID) value. The control field 192 can be arranged within the SLB as a header, a footer, etc.

Figure 7:
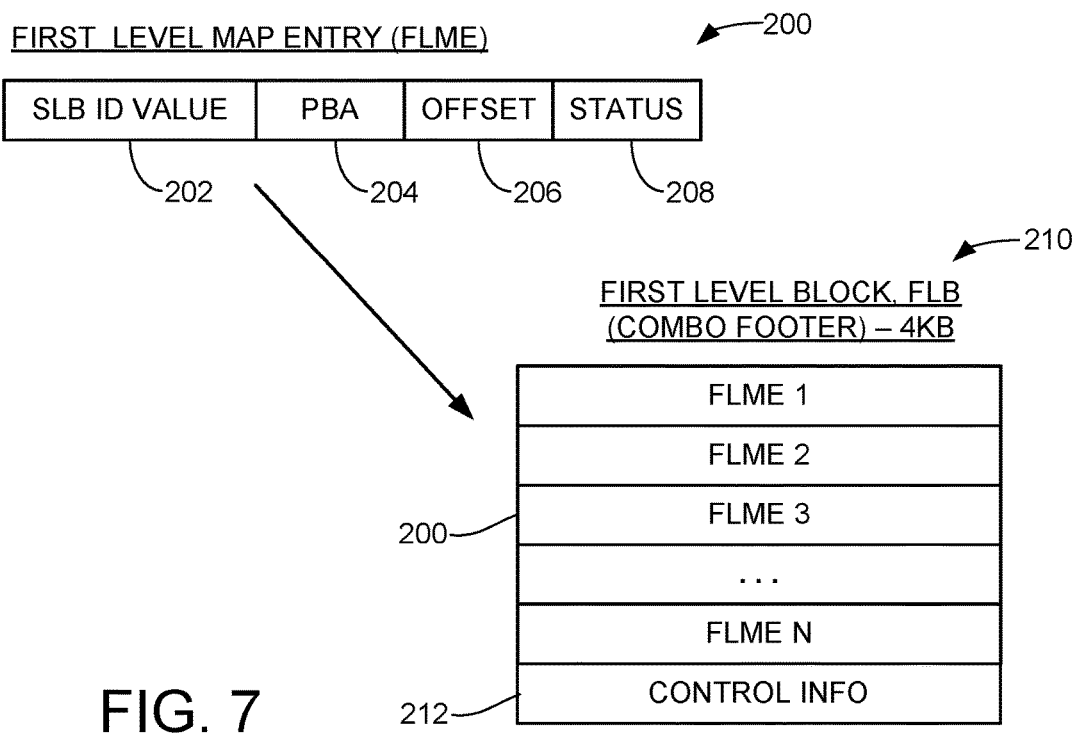
FIG. 7 illustrates an arrangement of first level map entries from FIG. 5 in some embodiments.

FIG. 7 shows a data structure referred to as a first level map entry (FLME) 200. The FLME 200 includes an SLB ID value field 202, a PBA field 204, an offset field 206 and a status field 208. As before, other arrangements can be used. The SLB ID value of field 202 represents the corresponding SLB tracked by the corresponding first level map entry 200.

Each SLB 190 tracks a relatively large number of SLMEs 180, and each SLME in turn tracks 4 KB of user data. Thus, additional information can be incorporated into the FLME 200 as well, such as a listing of blocks or groupings of blocks described by the second level data. The PBA field 204 provides the physical address for the SLB. The offset field 206 provides offset bit location as needed, and the status field 208 provides control information as described above.

A grouping of the FLMEs 200 are consolidated into a first level block (FLB) 210. The FLB, also sometimes referred to as a combo footer, is contemplated as constituting 4 KB of data, which is the same size as each of the SLBs 200 in FIG. 6. This size correspondence is helpful but is not limiting, as other respective sizes can be used as desired. As shown in FIG. 7, a total number N FLMEs 200 are incorporated into each FLB 210, where N is a selected integer. Control data may be incorporated into each FLB as indicated at 212.

Figure 8:
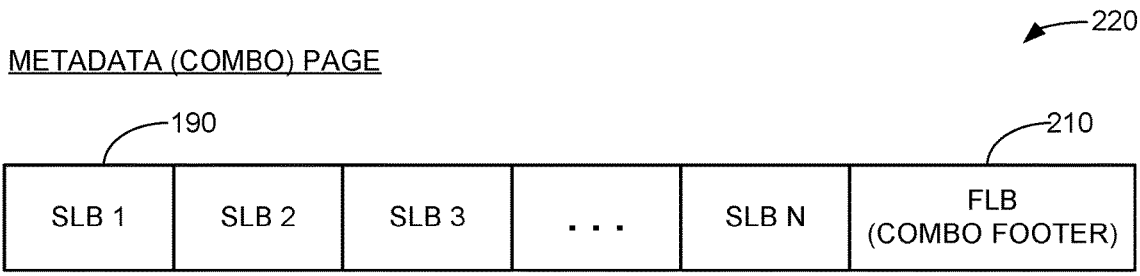
FIG. 8 is a format for a metadata (combo) page made up of second level blocks from FIG. 6 and a first level block (combo footer) from FIG. 7 in some embodiments.

FIG. 8 provides a representation of a metadata (combo) page 220. The combo page 220 incorporates a total number N SLBs 190 from FIG. 6 along with a corresponding FLB 210. The FLB 210 describes the various second level entries in the page (e.g., SLBs 1-N). As discussed above in FIG. 3, each page 150 stores 32 KB of user data in some embodiments. Since the present example uses SLBs 190 of 4 KB each, and the FLB 210 also constitutes 4 KB, the example shown in FIG. 8 provides a total of seven (e.g., N=7) SLBs 190 per combo page. Other arrangements can be used so that this is merely illustrative and not limiting.

In another embodiment, multiple pages of SLBs 190 may be described by each FLB (combo footer) 210, so that a combo page as used herein represents more than a single page of data. Such a combo page can constitute multiple pages of metadata written to the same row of memory cells 148 (e.g., TLCs store three pages of data, so all three pages can be described by a single combo footer), or a combo page can incorporate pages of metadata written to different rows of memory cells (e.g., the first page in each of a plurality of rows in a GCU can be combined into a combo page described by a corresponding combo footer).

Regardless of form, it will be understood that the use of the FLBs (combo footers) 210 distribute at least a portion of the first level map data 172 among the flash memory to provide localized identification of the associated second level map data 174 (FIG. 5). The term "combo page" thus refers to a page (or other unit of flash) that store a combination of both first and second level map entries, with the first level entries pointing to the associated second level entries. Among other advantages, this allows a single access operation to retrieve both the first and second level entries.

It is contemplated albeit not necessarily required that the combo pages 220 will be distributed across the various die/channel combinations within the flash memory 142, allowing efficient access and loading capabilities during metadata access operations. In at least some embodiments, the map metadata combo pages may be placed in separate, specially configured GCUs 154 (see FIG. 3) that only store map metadata and other control information for the SSD. However, in other embodiments portions of GCUs can be allocated for the storage of both metadata and regular user data. In this latter case, it is not necessarily required that the metadata that describes selected user data be stored in the same GCU that stores the selected user data, although there may be advantages to doing so.

Figure 9:
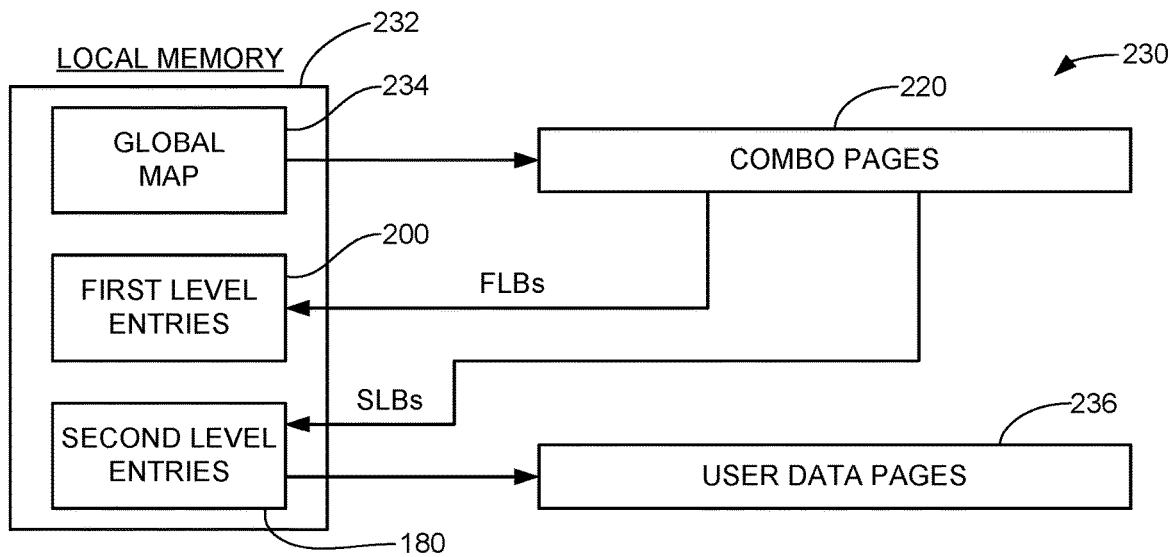
FIG. 9 is another representation of the metadata from FIGS. 5-8.

FIG. 9 shows a metadata structure 230 that incorporates the SLBs 190 and FLBs 210 from the various combo pages 220 from FIG. 8. A local memory 232 represents local controller (processor) memory used by the SSD 110, such as the memory 120 shown in FIG. 2. The local memory 232 stores a number of data structures including a global map structure 234.

The global map structure 234 forms a portion of the first level map data and serves as a table to locate the various FLBs 210 written to flash in the various combo pages 220. A data access sequence can thus constitute accessing the global map structure 232 to identify the location(s) of the desired combo footers 210, allowing the desired first level map entries (FMLEs) 200 (FIG. 8) to be retrieved to the local memory 232. The associated second level map entries (SLMEs) 180 can be concurrently retrieved to the local memory, either during the same or a subsequent data read to the same location in the flash. The needed second level map data can then identify the associated user data pages 236 in which the associated user data are stored.

Figure 10:
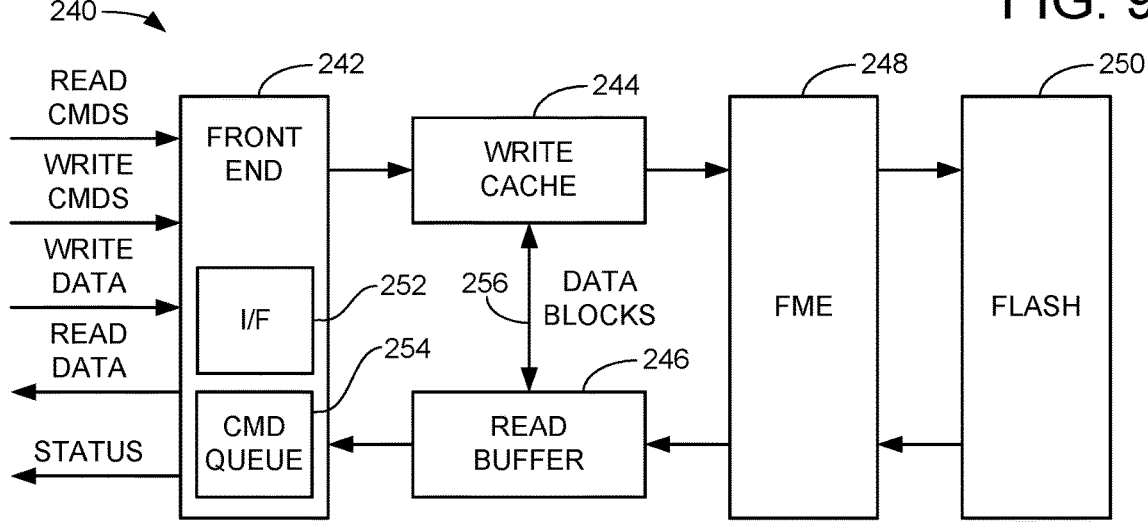
FIG. 10 shows data path circuitry of the SSD in some embodiments.

FIG. 10 provides a functional block representation of data path circuitry 240 of the SSD 110 in accordance with some embodiments. The circuitry 240 includes a front end 242, a write cache 244, a read buffer 246, flash memory electronics (FME) 248, and flash memory 250. The front end 242 interfaces with one or more client devices 101 (FIG. 1) using an interface (I/F) circuit 252. Pending access commands are stored in one or more command queues 254.

During normal operation of the SSD 110, the client(s) will issue various access commands including read and write commands. Each read command will constitute a request for some logical range (e.g., LBA range) of blocks to be retrieved from flash 250. Each write command will constitute a request to store some logical range of blocks to the flash, and will be accompanied by a transfer of the associated writeback data.

The front end 242 processes these and other commands and arranges the respective read and write commands into one or more of the command queues 254 pending execution. The writeback data are stored in the write cache 244 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME 248, which in turn directs the same to the flash 250. In the case of a write command, the writeback data are written to the next set of available pages 150 in an allocated GCU 154 (FIG. 3). In the case of a read command, the data are retrieved, subjected to error correction and other signal processing steps, and placed in the read buffer. The map metadata are accessed and updated as required during these operations.

The front end 242 provides various statuses to the client, including command complete statuses when commands are completed. For completed read commands, the command complete status may indicate that the requested readback data have been successfully retrieved and are now available for transfer from the read buffer 246. If writeback caching techniques are employed, the front end 242 may proceed to issue a write command complete status to the client, even if the writeback data are still pending in the write cache 244 and have not yet been written to the flash 250. To this end, the write cache 244 may take the form of NVM, such as NAND or NOR flash, although such is not necessarily required. The read cache 246 may normally be volatile memory, such as DRAM, since the readback data in the read cache can always be re-read from the non-volatile flash if required. Internal transfers of data blocks may occur at selected times between the write cache 244 and the read buffer 246, as depicted by arrow 256.

Figure 11:
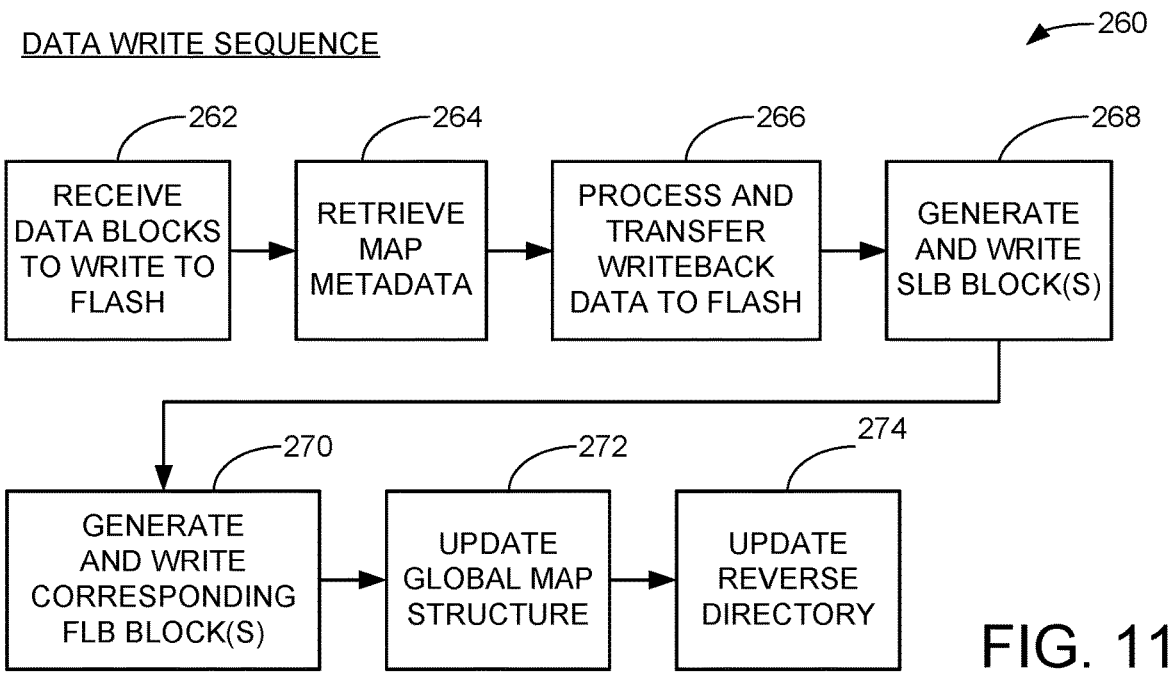
FIG. 11 is a data write sequence in which data are written to the SSD using the metadata of FIG. 10 in some embodiments.

The map metadata described in FIGS. 5 through 9 are used during various operations by the circuitry 240 of FIG. 10 including write operations, read operations and garbage collection operations. FIG. 11 provides a sequence diagram 260 for an exemplary data write sequence. The data write sequence is contemplated as comprising steps carried out to service a client write command, but it will be understood that similar processing is applied to internal (background writes) involving the relocation of user data, the writing of map updates, etc.

Block 262 shows an initial receipt of a set of data blocks to be written to flash. Map metadata associated with the data blocks are accessed at block 264. In the case of user data blocks, the location of older user data blocks in the flash is identified so that the metadata, once the write operation is completed, is updated to point to the location of the most current version of the data blocks. The retrieval of the map metadata can be carried out as described above in FIG. 9.

The data blocks are processed at block 266. This may include arrangement of the data into code words, parity sets, etc. Other processing is applied as required including error correction, encryption, compression, etc. Once processed, the data are transferred for storage by the flash. A next available set of pages in a currently allocated GCU may be selected as the target location to receive the write data (see e.g., user data pages 236 in FIG. 9).

Block 268 represents the generation of updated SLB blocks to provide second level map data to describe the location to which the data have been written. The corresponding FLB block(s) are generated at block 270 to describe the updated SLB blocks for each combo page. In some cases, the SLB and FLB blocks for each combo pages are transferred to flash as a part of the data write operation upon the associated user data blocks. In other cases, the combo pages are accumulated as writeback data and a separate write operation is scheduled at a later time. In this latter case, the combo pages can be arranged into parity sets as described above in FIG. 4 and written at an appropriate time. It will be appreciated that the queued SLBs and FLBs can remain resident in the local memory for subsequent use by the system as cached map data.

Additional metadata map structure updates are represented at blocks 272 and 274. In block 272, the global map structure 234 (FIG. 9) is updated to identify the storage location for the combo page(s). In block 274, a reverse directory is updated to provide a physical-to-logical translation layer for the local GCU. As noted above, the reverse directory can comprise a footer or other data structure that lists the various data blocks (such as by LBA, MU, etc.) that are stored in each GCU, which is useful during garbage collection operations as discussed below.

Figure 12:
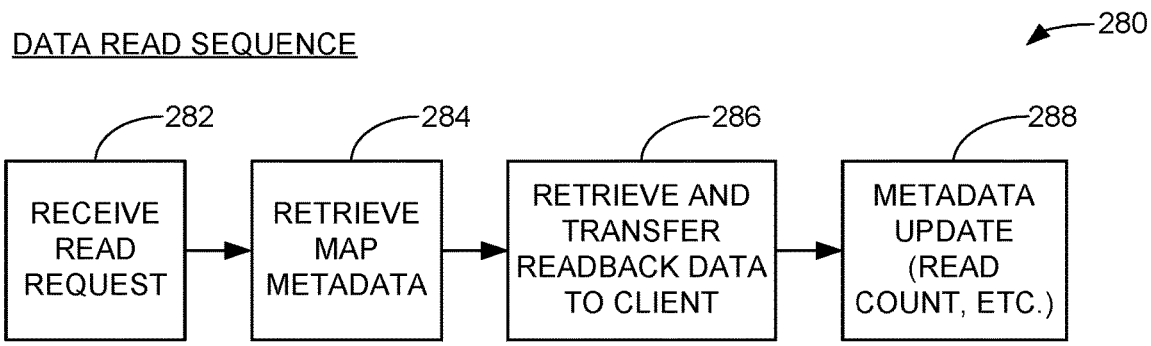
FIG. 12 is a data read sequence in which data are read from the SSD using the metadata of FIG. 10 in some embodiments.

FIG. 12 provides a data read sequence 280. As before, the read sequence is described in terms of a client read operation in which requested readback data are retrieved from the flash memory and returned to an external client. However, similar processing can be applied to internal background read operations carried out by the SSD (e.g., data relocations, garbage collection, calibrations, etc.).

A read request (command) is received or otherwise generated at block 282. The read request may be placed in a local read queue (see FIG. 10). Associated map metadata for the read request is retrieved at block 284. This may take place as described above in FIG. 9, so that the global map structure identifies the location of the first level entries, the first level entries are accessed to obtain the second level entries, and the second level entries are used to locate the storage location of the requested data.

The requested readback data are retrieved at block 286 from the identified location. Because the data are read from the flash, no significant updates are required to the metadata since the data remain in the same location identified by the map system. However, as desired, some metadata updates may occur as shown by block 288, such as the update of a read count, etc.

Figure 13:
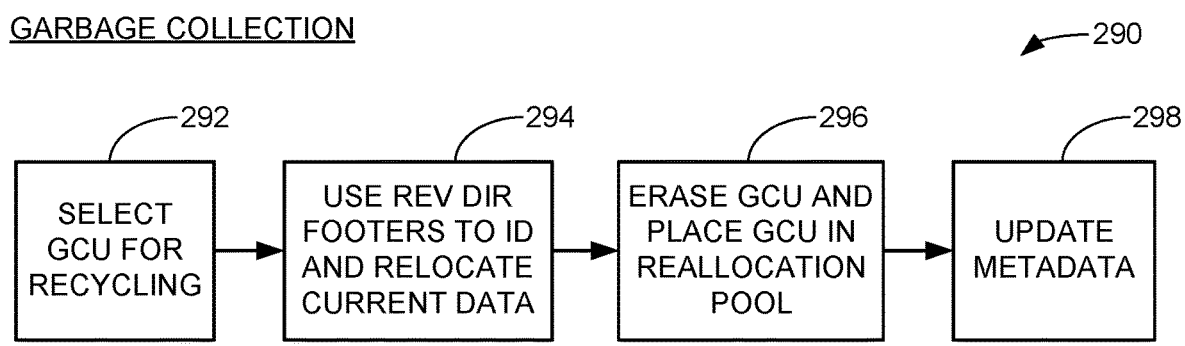
FIG. 13 is a garbage collection sequence in which garbage collection units (GCUs) are recycled using the metadata of FIG. 10 in some embodiments.

FIG. 13 illustrates a garbage collection sequence 290 carried out from time to time by the SSD 110. As discussed above, garbage collection recycles the various GCUs once each GCU is filled with user data blocks, and a sufficient number of the user data blocks are stale (e.g., no longer represent the latest versions of the data blocks). In such case, the current version blocks are identified, retrieved, copied over to a new location (e.g., a new GCU), an erasure operation is applied to the erasure blocks in the GCU, and the GCU is returned to an allocation pool pending allocation for the storage of new user data blocks.

A selected GCU is identified as a candidate for garbage collection at 292. The associated metadata for the selected GCU is accessed at block 294. As part of the garbage collection process, the metadata map and the reverse directory are utilized in conjunction to identify and process the current version data. The reverse directory identifies the total number of user data blocks in the selected GCU, and the map enables the controller to select which of these blocks are current version data. The reverse directory is retrieved from the GCU, and the associated map metadata are retrieved as described above in FIG. 9.

Once the current version data have been read from the GCU using the sequence 280 in FIG. 12 and written to the new GCU using the sequence 270 in FIG. 11, the selected GCU is erased and returned to the allocation pool, block 296. As required, metadata updates not otherwise carried out during the relocation of the data are finalized at block 298.

Figure 14:
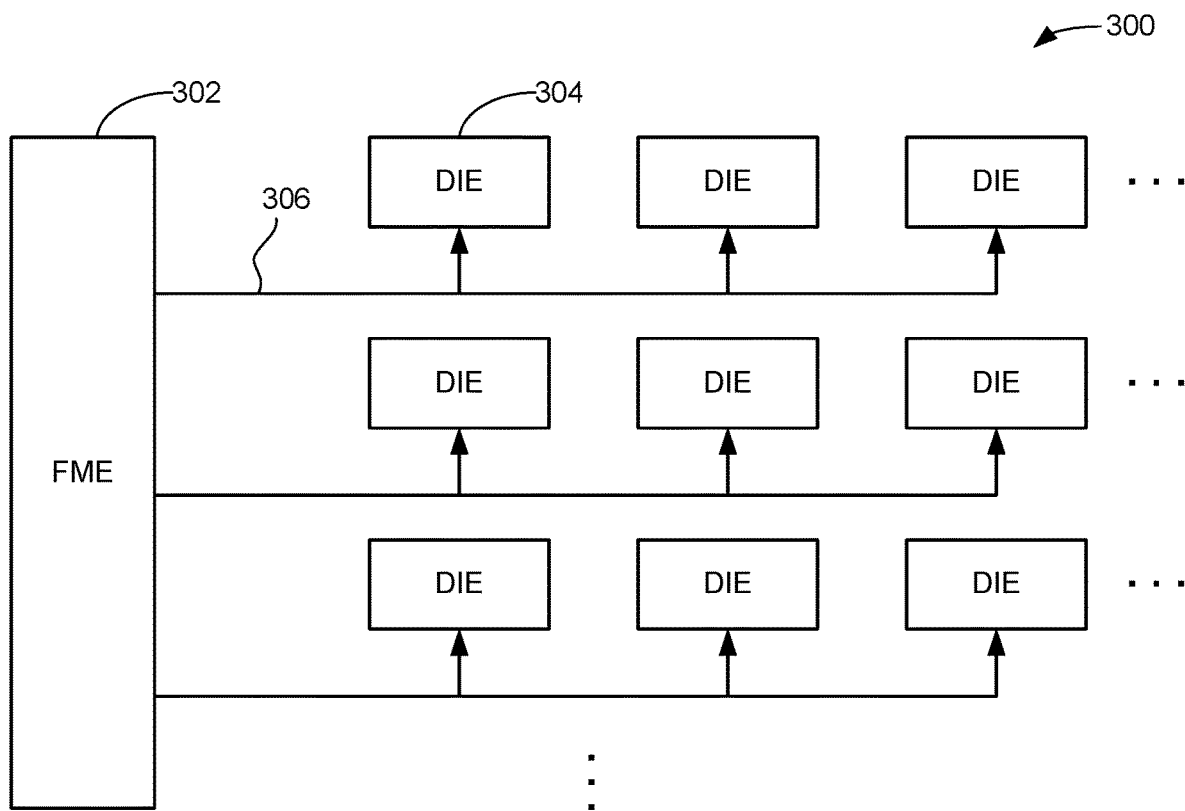
FIG. 14 is a functional depiction of another flash memory arranged as a series of semiconductor dies and channels in further embodiments.

FIG. 14 provides another flash memory 300 similar to the flash memory 140 discussed above. The flash memory 300 incorporates FME 302 which serve as a rudimentary front end processor for the flash array. Coupled to the FME 302 are a plurality of flash semiconductor dies 304 via channels (lanes) 306. For reference, all of the dies coupled to a selected channel are referred to herein as a die set. The channels 306 allow different dies to be accessed in parallel, although normally only one die from each die set can be accessed at a time. User data sets and map metadata sets can be distributed across the flash memory 300 as desired. As noted above, storing different combo pages across different die sets can enhance the ability to retrieve the map metadata blocks through parallel transfers along the respective channels.

Figure 15:
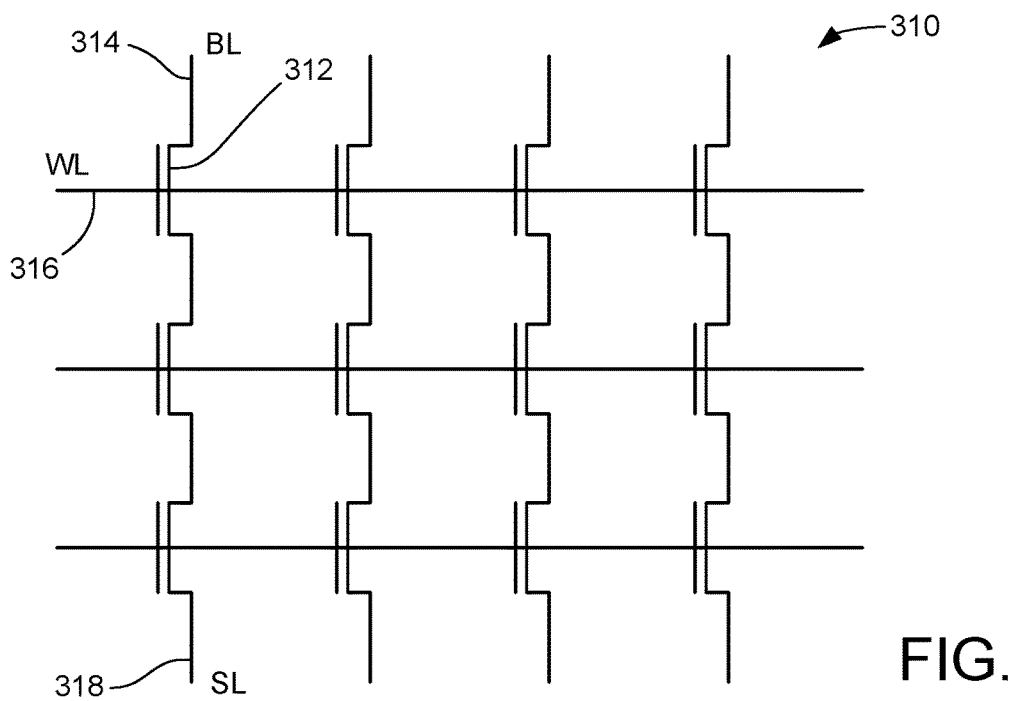
FIG. 15 is a schematic depiction of another flash memory showing individual flash memory cells and associated control lines in further embodiments.

FIG. 15 is a schematic representation of another flash memory 310 similar to those discussed above. The flash memory 310 is arranged as an array of flash memory cells 312 coupled to various control lines including bit lines (BL) 314, word lines (WL) 316 and source lines (SL) 318. As will be recognized, the programmed data are sensed in relation to the magnitude of control gate voltage applied to a given word line 316 in order to place the associated memory cell 312 in a source-drain conductive state (e.g., from BL to SL). To this end, pages of data are stored across groups of the memory cells 312 having a common word line (e.g., each row in FIG. 15). Multiple pages of data can be stored to the same row of memory cells using multiple program states (e.g., MLCs, TLCs, XLCs, etc.).

Accordingly, the use of the term "combo page" will be understood as an addressable unit of memory within the flash memory (or other NVM). It is contemplated that a combo page will be a single page of data written to a single row of memory cells, since a page represents the smallest block of data that can normally be concurrently retrieved from the flash. However, a combo page can also encompass multiple pages of memory such as multiple pages written to the same row of memory cells, as well as multiple pages of memory written to different rows of memory cells.

From FIGS. 14 and 15 it can be seen that the global map structure (such as 234, FIG. 9) can be accessed to identify the physical address of the combo footer(s) of one or more combo pages. The FME 302 can be instructed to retrieve the associated data from the combo page, which will include the combo footer information. The combo footer information will identify which of the second level blocks (SLBs) are needed to service the pending access command.

Depending upon the arrangement of the system, the FME can retrieve all of the data from the associated combo page to the local memory, after which the local controller can decode the combo footer to identify the necessary SLB from among the retrieved data. However, in an alternative embodiment a fast access can first take place to decode and retrieve the combo footer, after which the controller can request the FME to retrieve the specific SLB(s) needed for the pending access command.

It will now be appreciated that the various embodiments present a number of benefits over the art. Providing combo pages that store both first level map and second level map metadata can reduce the processing requirements upon the system, including by reducing the amount of map data that needs to be maintained locally in memory, as well as streamlining the ability to retrieve both the first and second level map data entries concurrently from the same location within the flash or other NVM. Distributing the combo pages across different die/channel combinations within the NVM can further enhance processing of the map metadata including parallel transfers between the NVM and local memory. In some cases, the overall size of the map metadata can be reduced over current schemes.

While the various embodiments have been described in terms of an SSD in an NVMe environment, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
generating map metadata for a non-volatile memory (NVM), the map metadata comprising second level map entries (SLMEs) configured to identify addresses in the NVM at which user data blocks are stored, and first level map entries (FLMEs) configured to identify addresses in the NVM at which the SLMEs are stored;
arranging the SLMEs into second level blocks (SLBs) each having a selected block size;
arranging the FLMEs into first level blocks (FLBs) each having the selected block size;
storing a plurality of the SLBs and a single FLB to a combined page of the NVM; and
retrieving a selected number of the SLBs and the single FLB from the combined page to service an access command to transfer selected user data blocks between the NVM and an external client device.

2. The method of claim 1, wherein the NVM comprises a flash memory, multiple addressable pages of the flash memory are stored to a row of flash memory cells coupled to a common word line, the combined page encompasses multiple ones of the multiple addressable pages, and the FLMEs in the single FLB identify the SLMEs in the plurality of the SLBs in the combined page as well as additional SLMEs in an additional SLB stored to a different page of the NVM stored to the row of flash memory cells.

3. The method of claim 1, wherein the combined page has an overall data storage capacity of nominally 32 KB, and wherein the selected block size of each of the SLBs and the single FLB is nominally 4 KB.

4. The method of claim 1, wherein each of the SLBs has a unique SLB identification (ID) value, and wherein the FLB includes the SLB ID values of the SLBs in the combined page.

5. The method of claim 1, wherein the retrieving step comprises retrieving all of the second level map entries from the combined page to the local memory.

6. The method of claim 1, wherein the retrieving step comprises retrieving less than all of the second level map entries from the combined page to the local memory.

7. The method of claim 1, wherein the NVM comprises a flash memory, and the combined page comprises an addressable page of memory in the flash memory stored to a row of flash memory cells coupled to a common word line.

8. The method of claim 1, wherein the NVM comprises a flash memory, multiple addressable pages of memory are stored to a row of flash memory cells coupled to a common word line, and the combined page is a selected one of the multiple addressable pages.

9. The method of claim 1, wherein the user data blocks each have the selected block size.

10. The method of claim 1, wherein the combined page is a first combined page, and wherein the map metadata further comprises a plurality of additional combined pages that respectively incorporate additional ones of the SLBs and the FLBs to describe storage locations of remaining user data blocks stored to the NVM.

11. An apparatus comprising:
a non-volatile memory (NVM) comprising a plurality of rows of memory cells to which pages of data may be written;
a metadata management circuit configured to store map metadata to a selected number of the pages characterized as combo pages in the NVM, each selected combo page comprising an addressable unit of the NVM that stores second level map entries (SLMEs) that provide a logical-to-physical address translation layer for user data blocks stored to the NVM, each selected combo page further storing first level map entries (FLMEs) that describe the SLMEs in the selected combo page, the SLMEs arranged into a plural integer number of second level blocks (SLBs) each having a selected block size, the FLMEs arranged into a single first level block (FLB) having the selected block size; and
a controller circuit configured to direct a transfer of user data between the NVM and a client device responsive to an access command received from the client device by accessing a global map structure in a local memory to identify a physical address of a selected combo page associated with the access command, retrieving the SLBs and the FLB from the selected combo page to the local memory responsive to the accessing of the global map structure, and using at least one of the SLMEs in the SLBs retrieved to the local memory to identify a physical address in the NVM associated with the access command.

12. The apparatus of claim 11, wherein the NVM comprises a flash memory and the memory cells comprise flash memory cells, wherein multiple addressable pages of the flash memory are stored to a selected row of flash memory cells coupled to a common word line, wherein the combo page encompasses multiple ones of the multiple addressable pages, and the FLMEs in the single FLB identify the SLMEs in the plurality of the SLBs in the combo page as well as additional SLMEs in an additional SLB stored to a different page stored to the row of flash memory cells.

13. The apparatus of claim 11, wherein the user data blocks are written to garbage collection units (GCUs) which are allocated and erased as a unit, and wherein both the user data and the associated combo pages for the access command are stored within a selected GCU.

14. The apparatus of claim 13, wherein the metadata management circuit further operates to generate and store a reverse directory to the selected GCU which provides a physical-to-logical translation layer to identify all of the user data blocks stored to the selected GCU.

15. The apparatus of claim 11, wherein the controller circuit directs a transfer of all of the contents of the selected combo page to the local memory.

16. The apparatus of claim 11, wherein the controller circuit evaluates the FLMEs from the selected combo page to identify a subset of the and directs a transfer of only the subset of the second level map entries to the local memory.

17. The apparatus of claim 11, wherein the NVM comprises a flash memory comprising an array of flash memory cells which store data in the form of accumulated charge, and wherein a selected grouping of the flash memory cells is coupled to a common word line in the flash memory, and wherein the selected combo page is written to the selected grouping of the flash memory cells.

18. A solid-state drive (SSD), comprising:
a flash memory comprising flash memory cells physically arranged on a plurality of semiconductor dies coupled to a plurality of channels, the flash memory cells logically arranged into a plurality of garbage collection units (GCUs) that are separately erased and allocated as a unit, each GCU further comprising a plurality of pages to which data can be written; and
a controller configured to write user data blocks to the respective GCUs responsive to access commands from an external client coupled to the SSD and to generate and store map metadata to describe physical locations of the user data blocks, the map metadata arranged as a plurality of combo pages, each combo page storing a combination of first level map metadata and second level map metadata, the second level map metadata providing a flash translation layer (FTL) to correlate logical addresses of the user data blocks to physical addresses at which the user data blocks are stored in the selected GCU and arranged as second level map entries (SLMEs) in a plural number of second level blocks (SLB) each having a selected size, the first level map metadata providing physical addresses of the SLMEs within the associated combo page and arranged as first level map entries (FLMEs) in a single first level block (FLB) having the selected size.

19. The SSD of claim 18, wherein the controller is further configured to generate and store a reverse directory to a selected GCU which provides a physical-to-logical translation layer to identify all of the user data blocks stored to the selected GCU.

20. The SSD of claim 18, wherein the controller is further configured to generate and access a global data structure which identifies a physical address of each of the combo pages in the flash memory.

* * * * *